May 11, 1954     E. A. PEABODY     2,677,961
PORTABLE HARDNESS TESTER
Filed Aug. 24, 1950
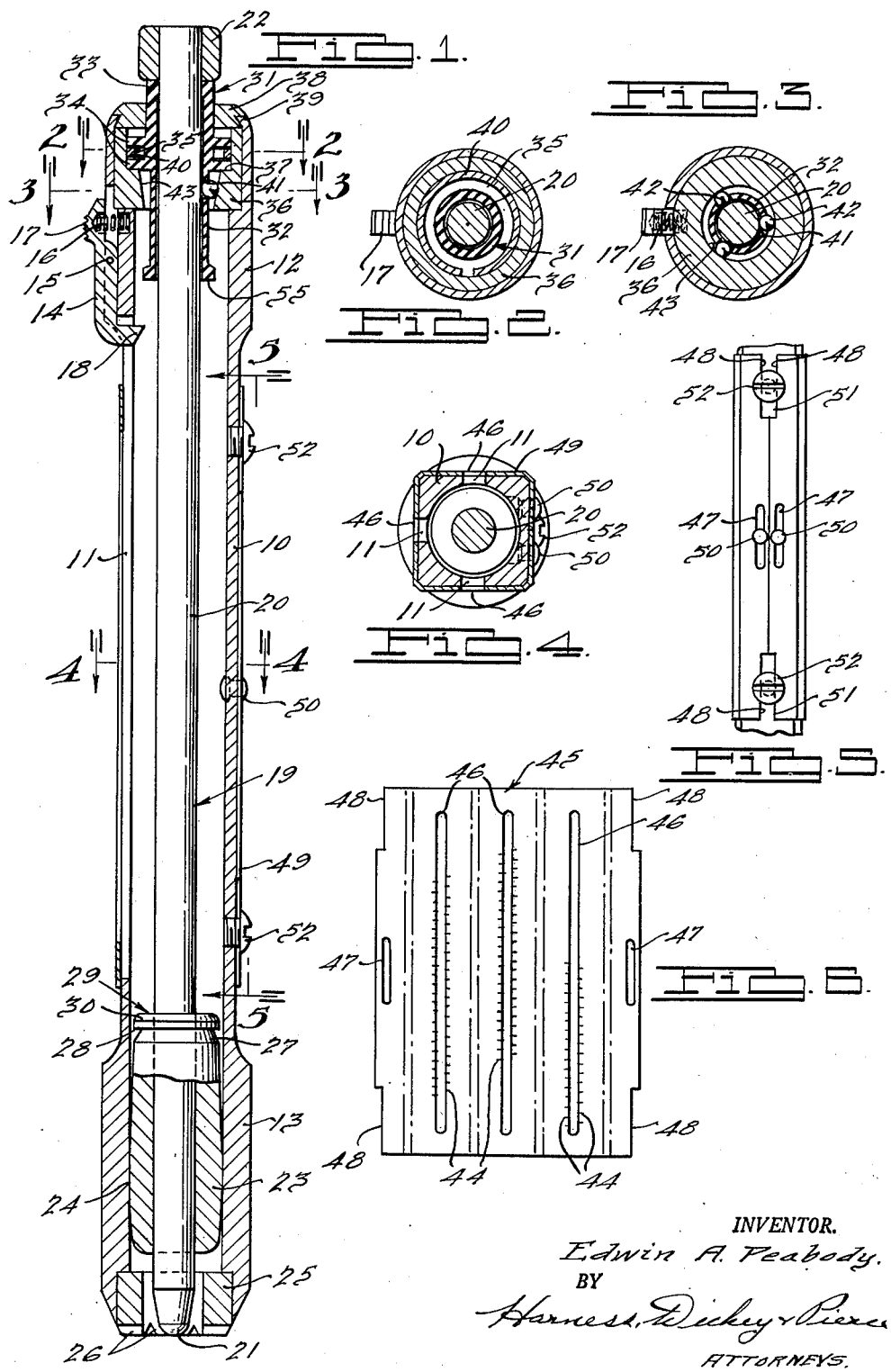
INVENTOR.
Edwin A. Peabody.
BY
Harness, Dickey & Pierce
ATTORNEYS.

Patented May 11, 1954

2,677,961

UNITED STATES PATENT OFFICE 2,677,961

PORTABLE HARDNESS TESTER

Edwin A. Peabody, Detroit, Mich., assignor to
Paul Zaro, Detroit, Mich.

Application August 24, 1950, Serial No. 181,147

3 Claims. (Cl. 73—79)

This invention relates to hardness testing devices and more particularly to a hardness testing device of the portable type.

The present invention relates to a hardness testing device in which, like the Rockwell type of testing machine, a positive reading is obtained, but which differs therefrom in that the present device is portable. Also, with the present invention the personal equation which is present in the Scleroscope and Brinell types of instruments is eliminated.

The device of this invention is constructed to provide free fall to a hammer combined with an accurate clutch element for holding the hammer at rebound height so that scales may be read directly from a scale indicia member on the body of the device giving Rockwell, Brinell, Scleroscope, and other scale readings.

The hardness testing device of the present invention provides readings within a satisfactory degree of accuracy for shop use, thereby providing hardness readings instantly on the job.

One of the important objects of this invention is to provide a device of the character described comprising a minimum number of parts which may be economically manufactured and readily assembled.

Another important feature of the invention is the provision of improved means for applying or associating the scale indicia with the device whereby this indicia may be produced on a flat sheet and then wrapped around the body of the device and assembled therewith for adjustment to initially set the graduations of the scales to obtain a maximum degree of accuracy of readings.

Still another important feature of the invention is the provision of a clutch mechanism formed of plastic material, preferably of a nylon-base plastic, which is light in weight, is not soluble or deleteriously affected by oil, water or industrial cleaners, is stable and warp-resistant, and may be easily machined.

A still further object of the invention is to provide a clutch mechanism having a shiftable part movable directly by the hammer assembly to operative and inoperative positions just prior to the completion of the striking movement and prior to the movement of the hammer assembly into latched position.

Various other objects, advantages, and novel details of construction of the invention will be made more apparent as this description proceeds, especially when considered in connection with the accompanying drawing in which:

Figure 1 is a longitudinal, sectional, elevational view of a hardness testing device constructed in accordance with this invention;

Fig. 2 is a transverse sectional view taken substantially on the plane indicated by line 2—2 in Fig. 1;

Fig. 3 is a transverse sectional view taken substantially on the plane indicated by line 3—3 in Fig. 1;

Fig. 4 is a transverse sectional view taken substantially on the plane indicated by line 4—4 in Fig. 1;

Fig. 5 is a fragmentary elevational view as viewed from line 5—5 of Fig. 1; and

Fig. 6 is a plane view of the indicia member before being bent and assembled with the body of the device.

The hardness testing device of the present invention is of small, compact size, and in its carrying position as illustrated in Fig. 1 is readily portable. The device comprises a hollow body 10 which, in the embodiment illustrated, is of square tubular form exteriorly and made of stainless steel or like hard material having a longitudinal slot 11 disposed in at least three of the four faces thereof between the enlarged upper and lower ends 12 and 13 thereof.

Mounted in a slot in the upper end 12 is a latch 14 having a pivot 15 about which it oscillates into and out of latching engagement. A spring 16 normally urges the latch 14 in one direction, and a knob 17 is provided on the latch for oscillating the same to unlatched position. The lower end of the latch is provided with a detent 18 for a purpose to be explained hereinafter.

The hammer assembly 19 comprises a cylindrical rod 20 which is hardened and accurately ground and is provided with a broad arcuate striking point 21 at its lower end and a knurled knob 22 at its upper end. A hammer element 23 of substantially cylindrical form is press-fitted or otherwise secured upon the rod 20 adjacent the striking end or point 21. The hammer element 23 is provided intermediate its ends with a circumferentially extending enlarged area 24 which is out of contact with the bore but which guides the lower end of the hammer during its reciprocal movement permitting only line engagement therewith. The striking end 21 of the hammer extends freely through a collar 25 press-fitted or otherwise secured in the lower end portion 13 of the body. The collar 25 may be provided with V slots 26 for locating the end of the device along a bar or rod.

The hammer element 23 is formed with a circumferentially extending notch or recess 27 adapted to be engaged by the detent 18 of the latch 14 to retain the striking end 21 of the hammer at a predetermined height above the collar 25 thus providing a standard length of fall for the hammer each time it is dropped. Adjacent the notch or recess 27 the hammer element 23 is formed with a head 28 forming a shoulder 29 for a purpose to be hereinafter described. The head 28 is provided with a vernier or indicating line 30 of a contrasting color from which readings may be directly taken in a manner hereinafter described.

Mounted about the upper end of rod 20 is a clutch mechanism, the movable part of which is indicated generally by the reference characters 31. The mechanism comprises a cylindrical cage portion 32 at one end, an upper sleevelike portion 33 adapted for engagement with the knob 22, and intermediate spaced circumferentially extending shoulders 34 forming an annular recess 35. A clutch collar 36 is press-fitted or otherwise secured in the upper end 12 of the body 10 and this collar is provided with an annular shoulder 37 limiting movement of the clutch mechanism 31 in one direction. Movement of the clutch mechanism 31 in the other direction is limited by a closure or cap member 38 secured in the open end of the end portion 12 by swaging the end wall, as shown at 38, into an annular recess formed in the closure or cap member 38.

Thus, the clutch mechanism is capable of movement relative to rod 20 within the limits defined by the shoulder 37 of collar 36 and the underface of closure member 38. Disposed in the annular recess 35 is resilient friction ring 40 which engages the inner surface of the collar 36 to hold the cage portion 32 of the clutch mechanism 31 in raised position, after it has been moved to this position, by engagement of shoulder 29 with the lower end of cage 32.

The cage 32 of the clutch mechanism is provided with a plurality of apertures 41, preferably three in number, in each of which a hardened ball 42 is nested. The inner adjacent wall of the clutch collar 36 is provided with a conical surface 43 of such extent and diameter as to be wedgingly engaged by the balls 42 when the cage 32 is in lowered position. When the cage 32 is in raised position the balls 42 are out of wedging contact with the conical surface 43 and the rod 20.

The movable part of the clutch mechanism 31 is formed of a plastic material, preferably of a nylon-base plastic. It has been found that such a material is highly efficient because it is light in weight, is not deleteriously affected by oil, water or industrial cleaners, is stable and warp-resistant and may be easily machined.

In order to facilitate the production and application of scale indicia to the device, the scales 44 are etched, impressed or applied in any preferred manner to a flat sheet 45 of metal or other suitable material. This sheet is provided with slots 46 adjacent to which the scale indicia are located. The sheet 45 is also provided with a pair of slots 47 and a plurality of cut-away portions or notches 48 adjacent its corners. The sheet 45 is assembled with the body 10 of the device by wrapping the same therearound as shown in Figs. 4 and 5, thus forming a tube 49 enclosing the body 10 with the slots 46 in registration with the slots 11 of the body. The tubular indicia member 49 is secured in place by rivets or the like 50 engaging the body 10 and the slots 47. The cut-away portions 48, when the sheet 45 is assembled on the body 10, form slots 51 which receive set screws 52 threaded into the body 10. By this arrangement the tubular indicia member 49 may be adjusted longitudinally of the rivets to initially set the scales so that a maximum degree of accuracy of readings is obtained. The vernier or indicating line 30 on the head of the hammer element 23 indicates the height of rebound relative to the scale indicia 44, the line 30 being visible through the registering slots 11 of the body 10 and 46 of the indicia member 49.

In operation, the knob 22 is grasped by the operator and is raised to elevate the hammer element 23 into latched position with the detent 18 engaging the notch 27. In this operation, the lower end 55 of the cage 32 of the clutch mechanism 31 is engaged by shoulder 29 of head 28, and the movable clutch part is moved upwardly and retained in this raised position by the frictional engagement of friction ring 40 with the inner surface of collar 36. The lower end 13 is then placed against the material to be tested and the latch 14 is released to permit a free fall of the rod 20, the hammer element 23, and the knob 22, which will occur if the body 10 is maintained in vertical position. The striking end 21 strikes the material being tested, and as a result thereof rebounds to a height conforming to the hardness of the material. Just prior to the striking of the blow the knob 22 strikes the end of the sleeve portion 33 of the clutch mechanism 31 and moves the same downwardly to the position illustrated in Fig. 1 wherein the balls 42 are in position to lock the rod 20 against downward movement on the cam surface 43. Therefore at the top of the rebound the balls 42 will form a wedge lock between the cam surface 43 and the rod 20, thereby retaining the rod substantially at the maximum point of rebound. Readings may then be taken by means of the scales 44 and the vernier line 30 visible through the registering slots 11 and 46. The graduations of the scales 44 may be such that readings may be made in Rockwell B, Rockwell C, Brinell, Scleroscope and the like.

With the parts fully telescoped as shown in Fig. 1, the device is compact and of a size that may be easily carried in the pocket of the operator. The device is constructed from a minimum number of parts which may be economically manufactured and readily assembled.

What is claimed is:

1. In a hardness testing device, a one-piece body having a bore extending entirely therethrough so as to be open at both ends, said body having a slot communicating with the bore and disposed parallel to the axis thereof, a rod extending through said bore with its upper end projecting therebeyond and with its lower end provided with a striking point having a broad arcuate face which is projectable from the lower end of the body, a hammer element of substantial mass having a central aperture through which said rod extends and to which it is secured with the striking point extending therebeyond, said hammer element being of a diameter to snugly fit the body bore, a shiftable clutch mechanism mounted in the upper end of the bore for limited movement therein, and means on the rod for shifting said clutch mechanism downwardly into clutch position near the end of the fall of the rod, there being indicia on said body adjacent to said slot for indicating hardness readings.

2. In a hardness testing device, a one-piece body having a bore extending entirely therethrough so as to be open at both ends, said body having a slot communicating with the bore and disposed parallel to the axis thereof, a rod extending through said bore with its upper end projecting therebeyond and with its lower end provided with a striking point having a broad arcuate face which is projectable from the lower end of the body, a hammer element of substantial mass having a central aperture through which said rod extends and to which it is secured with the striking point extending therebeyond, said hammer element being of a diameter to snugly fit the body bore, a shiftable clutch mechanism mounted in the upper end of the bore for limited movement therein, means on the rod for shifting said clutch mechanism downwardly into clutch position near the end of the fall of the rod, a tube formed from a flat sheet with the adjacent ends substantially abutting, having at least one slot therein with indicia adjacent thereto, said tube being disposed on the body for adjustment thereon, and means on said body by which the tube is adjusted to different positions for locating the indicia relative to the body slot.

3. In a hardness testing device, a one-piece body having a bore extending entirely therethrough so as to be open at both ends, said body having a slot communicating with the bore and disposed parallel to the axis thereof, a rod extending through said bore with its upper end projecting therebeyond and with its lower end provided with a striking point having a broad arcuate face which is projectable from the lower end of the body, a hammer element of substantial mass having a central aperture through which said rod extends and to which it is secured with the striking point extending therebeyond, said hammer element being of a diameter to snugly fit the body bore, a shiftable clutch mechanism mounted in the upper end of the bore for limited movement therein, means on the rod for shifting said clutch mechanism downwardly into clutch position near the end of the fall of the rod, and a sleeve in said clutch mechanism having a central aperture through which the rod extends and through which it freely falls when testing the hardness of a material, said sleeve being made of plastic material so as not to detract substantially from the striking force of the rod when shifting the sleeve just prior to the time the rod end strikes the material to be tested.

References Cited in the file of this patent

UNITED STATES PATENTS

| Number | Name | Date |
|---|---|---|
| 1,444,606 | Herrmann | Feb. 6, 1923 |
| 1,446,620 | Hall | Feb. 27, 1923 |
| 1,490,836 | Lipps | Apr. 15, 1924 |
| 1,762,639 | Roudie | June 10, 1930 |
| 2,288,560 | Webber | June 30, 1942 |
| 2,316,377 | Wilhelm | Apr. 13, 1943 |
| 2,427,151 | Mick | Sept. 9, 1947 |

FOREIGN PATENTS

| Number | Country | Date |
|---|---|---|
| 33,427 | France | May 2, 1928 |
| | (Addition to No. 623,985) | |
| 854,464 | France | Jan. 19, 1940 |